United States Patent
Ishikawa (10) Patent No.: US 10,335,860 B2
(45) Date of Patent: Jul. 2, 2019

(54) MACHINE TOOL (71) Applicant: STAR MICRONICS CO., LTD., Shizuoka-shi (JP)

(72) Inventor: Takayuki Ishikawa, Shizuoka (JP)

(73) Assignee: STAR MICRONICS CO., LTD., Shizuoka-Shi (JP)

( * ) Notice: Subject to any disclaimer, the term of this patent is extended or adjusted under 35 U.S.C. 154(b) by 0 days.

(21) Appl. No.: 15/618,355

(22) Filed: Jun. 9, 2017

(65) Prior Publication Data
US 2017/0274457 A1 Sep. 28, 2017

Related U.S. Application Data (63) Continuation of application No. PCT/JP2015/073682, filed on Aug. 24, 2015.

(30) Foreign Application Priority Data

Feb. 9, 2015 (JP) .................. 2015-022900

(51) Int. Cl.
*B23B 7/06* (2006.01)
*B23Q 1/26* (2006.01)
(Continued)

(52) U.S. Cl.
CPC ............... *B23B 7/06* (2013.01); *B23Q 1/017* (2013.01); *B23Q 1/26* (2013.01); *F16C 29/005* (2013.01);
(Continued)

(58) Field of Classification Search
CPC .. B23B 7/06; B23B 9/005; B23B 9/02; B23B 13/021; B23B 13/126; B23B 2250/16; B23Q 1/26; B23Q 1/70; F16C 29/12
(Continued)

(56) References Cited

U.S. PATENT DOCUMENTS 4,877,338 A * 10/1989 Aman .................. B23Q 1/26
                                                        384/26
8,171,830 B2 * 5/2012 Ozawa .................. B23B 7/06
                                                        82/142
(Continued)

FOREIGN PATENT DOCUMENTS

CH         608399 A5 *  1/1979   ............... B23B 7/06
CN         2449865         9/2001
(Continued)

OTHER PUBLICATIONS

SIPO, Office Action of CN 201580075629.5 dated Jul. 20, 2018.
Taiwan Intellectual Property Office, Office Action of TW 104143641 dated Dec. 11, 2018.

*Primary Examiner* — Ryan C Rufo
(74) *Attorney, Agent, or Firm* — Lex IP Meister, PLLC (57) ABSTRACT

The invention provides a machine tool capable of facilitating a switching between a guide bush mode and a non-guide bush mode. A machine tool comprises a headstock provided with a main spindle for gripping a workpiece, a rail extended along a main spindle axis, a first bearing fixed to the headstock and guided on the rail, a second bearing fixed to the headstock on the front side of the first bearing and guided on the rail, a supporting bed on which a guide bush is removably mounted, and a guide mounted on the supporting bed to movably support the headstock in a direction of the main spindle axis when the guide bush is removed. The rail provides a larger play on the second bearing when the headstock is supported by the guide than when the headstock is not supported by the guide.

4 Claims, 10 Drawing Sheets

(51) Int. Cl.
  *B23Q 1/70* (2006.01)
  *F16C 29/12* (2006.01)
  *F16C 29/00* (2006.01)
  *B23Q 1/01* (2006.01)

(52) U.S. Cl.
  CPC ........ *F16C 29/12* (2013.01); *B23B 2260/008* (2013.01); *B23Q 1/70* (2013.01); *F16C 2322/39* (2013.01)

(58) Field of Classification Search
  USPC .............................................. 29/37 A, 37 R
  See application file for complete search history.

(56) References Cited

U.S. PATENT DOCUMENTS

| | | |
|---|---|---|
| 9,020,629 B2 | 4/2015 | Matsunaga |
| 2007/0224007 A1 | 9/2007 | Shinohara |
| 2011/0179918 A1 | 7/2011 | Baumann |

FOREIGN PATENT DOCUMENTS

| | | | |
|---|---|---|---|
| CN | 2488632 | 5/2002 | |
| CN | 201157910 | 12/2008 | |
| CN | 201423447 | 3/2010 | |
| CN | 102510956 | 6/2012 | |
| EP | 1281473 A2 * | 2/2003 | ............... B23B 7/06 |
| GB | 813046 A * | 5/1959 | ........... B23B 13/126 |
| JP | 2008-279541 | 11/2008 | |
| TW | M454265 | 6/2013 | |
| WO | 2005/65870 | 7/2005 | |
| WO | 2008/81744 | 7/2008 | |

\* cited by examiner

MACHINE TOOL

CROSS-REFERENCE TO RELATED APPLICATION

This application is a continuation of International Patent Application No. PCT/JP2015/073682, filed on Aug. 24, 2015, which claimed priority of Japanese Patent Application No. 2015-22900 filed on Feb. 9, 2015. The contents of these applications are incorporated herein by reference in their entirety.

BACKGROUND

(a) Field

The present invention relates to a machine tool provided with a headstock movable in the axial direction of a main spindle.

(b) Description of the Related Art

A sliding headstock type lathe is conventionally known in which a workpiece is slidably supported by a guide bush mounted on the front side of a main spindle. When the guide bush is used, the workpiece chucked by the main spindle is slidably supported by the guide bush to be machined by a tool on the front side of the main spindle. Any load likely imposed on the workpiece in a direction perpendicular to the main spindle axis would be received by the guide bush, enabling a longer workpiece, which likely bends, to be machined with high accuracy. When the guide bush is not used to machine a shorter workpiece, a headstock need be shifted toward the front side to hold the workpiece without support on the front side of the main spindle.

In a sliding headstock type lathe disclosed in Japanese Patent Application Publication No. 2008-279541 in which a guide bush is not used, a sliding bearing and a ball bearing (a rolling bearing) are provided to support a headstock respectively on the front side and on the rear side in a movable manner in the axial direction of a main spindle. The distal end of the headstock is supported on a bed via the sliding bearing while the base end thereof is supported via the ball bearing at two points apart in a direction perpendicular to the the main spindle axis.

SUMMARY

It is desirable to facilitate a switching between a guide bush mode in which a guide bush is used and a non-guide bush mode in which a guide bush is not used. There is no suggestion of the problem in Japanese Patent Application Publication No. 2008-279541 in which the lathe is not provided with a guide bush.

The present invention is to provide a machine tool capable of facilitating a switching between the guide bush mode and the non-guide bush mode.

A machine tool of the invention comprises a headstock provided with a main spindle for gripping a workpiece; a rail extended along a main spindle axis; a first bearing fixed to the headstock and guided on the rail; a second bearing fixed to the headstock on the front side of the first bearing and guided on the rail; a supporting bed on which a guide bush is removably mounted to slidably support the workpiece on the front side of the main spindle; and a guide mounted on the supporting bed to movably support the headstock in a direction of the main spindle axis when the guide bush is removed. The rail provides a larger play on the second bearing when the headstock is supported by the guide than when the headstock is not supported by the guide.

The first aspect of the invention provides a machine tool capable of facilitating a switching between a guide bush mode in which a guide bush is used and a non-guide bush mode in which a guide bush is not used. The second aspect of the invention provides a machine tool capable of eliminating the need of specially modifying the rail. The third aspect of the invention provides a machine tool suitable in an environment in which an unsupported portion of the rail is not provided enough.

DETAILED DESCRIPTION

An embodiment of the present invention is being described. The embodiment is only an example of the invention. The features included in the embodiment are not necessarily essential to a solution of the invention.

(1) SUMMARY OF TECHNOLOGY INCLUDED IN THE INVENTION

A summary of technology included in the present invention is being described referring to FIG. 1 to FIG. 9 schematically showing a sliding headstock type lathe 1 as an example of a machine tool. The drawings may have a mismatch to each other due to different magnification ratio in each direction.

The machine tool 1 of the invention includes a headstock 10 provided with a main spindle 12 for gripping a workpiece W1, a rail 200 extended along a main spindle axis AX1, a first bearing 110, a second bearing 120, a supporting bed 30 on which a guide bush 32 is removably mounted, and a guide 40 (for example, a quill guide 40) provided on the supporting bed 30 when the guide bush 32 is removed. The first bearing 110 is fixed to the headstock 10 and guided on the rail 200. The second bearing 120 is fixed to the headstock 10 on the front side S1 of the first bearing 110 and guided on the rail 200. When the guide bush 32 is used, the workpiece W1 is slidably supported by the guide bush 32 on the front side of the main spindle 12. When the guide bush is not used, the headstock 10 is movably supported by the guide 40 in a main spindle axial direction D1. The rail 200 provides a larger play on the second bearing 120 when the headstock 10 is supported by the guide 40 (or when the guide 40 is used) than when the headstock 10 is not supported by the guide 40 (or when the guide 40 is not used).

Figure 10A:
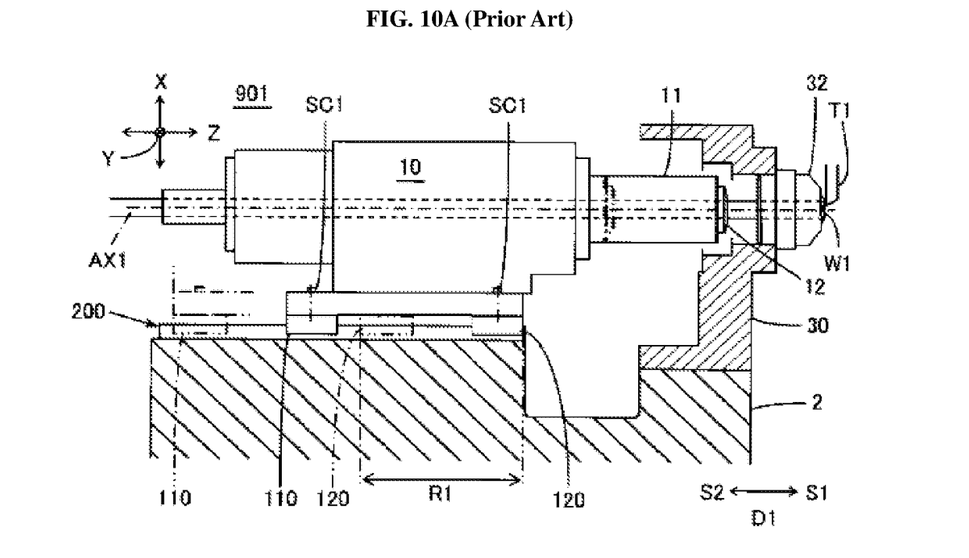
FIG. 10A is partially sectional schematic view of a main part of a lathe in a comparative example.
Figure 10B:
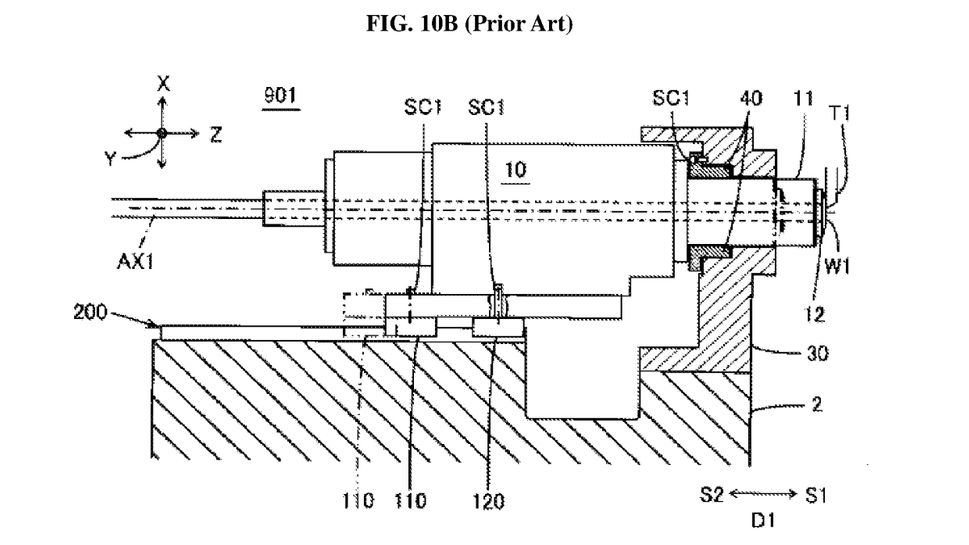
FIG. 10B is partially sectional schematic view of a main part of a lathe in a comparative example.

FIG. 10A and FIG. 10B are schematic drawings of a lathe 901 in a comparative example. FIG. 10A shows the lathe not using the guide 40 in a guide bush mode in which the guide bush 32 is used. FIG. 10B shows the lathe using the guide 40 in a non-guide bush mode in which the guide bush 32 is not used. The headstock 10 in the most advanced position is illustrated by a solid line while in the most retracted position by a two-dot chain line. The lathe 901 includes a base 2, the headstock 10 which rotatably supports the main spindle 12 for gripping the workpiece W1, the rail 200 extended along the main spindle axis AX1, a ball bearing (the first bearing 110 and the second bearing 120), and the supporting bed 30. A cylindrical quill 11 is provided on the front side of the headstock 10 to support the main spindle 12 in a rotatable manner around the main spindle axis AX1. The main spindle 12 is moved in a Z-direction (in the main spindle axial direction D1) by a not-shown driving unit. The rail 200 is entirely fixed on the base 2 to be supported thereby in a longitudinal direction (in the main spindle axial direction D1). In the guide bush mode as shown in FIG. 10A, the first bearing 110 on the rear side S2 and the second bearing 120 on the front side S1 are guided on the rail 200 to move the headstock 10 in the Z-direction (in the main spindle axial direction D1). The rail 200 has a length slightly exceeding the distance between the position of the first bearing 110 when the headstock 10 is in the most retracted position and the position of the second bearing 120 when the headstock 10 is in the most advanced position.

The guide bush mode is switched to the non-guide bush mode in the following manner to machine a shorter workpiece. First, the guide bush 32 is removed from the supporting bed 30, the headstock 10 is moved to the rear side, and the quill guide 40 is set around the quill 11. The headstock 10 is moved to the front side as far as the second bearing 120 remains on the rail 200. Movement of the headstock 10 is restricted within a range capable of retaining the second bearing 120 on the rail 200. The quill guide 40 is then joined to the supporting bed 30 by a screw SC1. The headstock 10 is jacked up within a slight gap between the quill 11 and the quill guide 40 to unscrew the second bearing 120. The unscrewed second bearing 120 is slid to the rear side and joined to the headstock 10 with another screw SC1, and finally the headstock 10 is jacked down. As shown in FIG. 10B, the second bearing 120 is still supported by the rail 200 when the headstock 10 is moved to the front side.

The non-guide bush mode is switched to the guide bush mode in the following manner. The headstock 10 is moved to the rear side, and then jacked up within a slight gap between the quill 11 and the quill guide 40 to unscrew the second bearing 120. The unscrewed second bearing 120 is slid to the front side and joined to the headstock 10 by the screw SC1. The headstock 10 is jacked down, and further moved to the rear side. Finally, the quill guide 40 is removed from the supporting bed 30, and the guide bush 32 is attached to the supporting bed 30.

As described above, such switching process is complicated and time-consuming. The quill 11 and others must be carefully protected from any damage especially when the headstock 10 is jacked up within a slight gap between the quill 11 and the quill guide 40.

According to the invention, the rail 200 provides a larger play on the second bearing 120 when the guide 40 is used than when the guide 40 is not used, as shown in FIG. 1 to FIG. 9. When the guide 40 is not used, the headstock 10 is supported with accuracy by the first bearing 110 on the rear side S2 and the second bearing 120 on the front side S1. When the guide 40 is used, the headstock 10 is additionally supported by the guide 40 provided on the supporting bed 30. The headstock 10 is supported at three points from the rear side to the first side by the first bearing 110, the second bearing 120, and the guide 40. Only a small play provided on all of these points would inhibit smooth movement of the headstock 10 or cause damage on part of the headstock 10. According to the invention, the second bearing 120 is provided with a larger play when the guide 40 is used than when the guide 40 is not used. The headstock 10 is in fact supported with accuracy at two points by the first bearing 110 on the rear side S2 and the guide 40 on the front side S1. Three-point support (multi-support) in the main spindle axial direction D1 is inhibited to assure smooth movement of the headstock 10 and prevent damage. In switching to the non-guide bush mode, the headstock 10 supported by the guide 40 may be moved toward the front side into a range in which the second bearing 120 is provided with a larger play. In switching to the guide bush mode, the headstock 10 may be moved toward the rear side into a range in which the second bearing 120 is provided with a smaller play and then the guide bush 32 may be attached to the supporting bed 30. The invention provides a machine tool capable of facilitating a switching between the guide bush mode and the non-guide bush mode. The play provided on the second bearing 120 corresponds to a moving range of the second bearing 120 in a direction perpendicular to the direction of the main spindle axis. The play provided on the second bearing 120 includes a moving range of the second bearing 120 along with the rail and a moving range of the second bearing 120 with respect to the rail.

The machine tool 1 may be provided with the base 2 on which the rail 200 is supported. As shown in FIG. 1 to FIG. 7, when the headstock 10 is supported by the guide 40, a portion 212 of the rail 200 within a moving range R2 of the second bearing 120 need not be supported by the base 2. The rail 200 may overhang the base 2. The portion 212 within the moving range R2 of the second bearing 120 when the guide 40 is used may be lower in rigidity than a portion 211 within a moving rage R1 of the second bearing 120 when the guide 40 is not used. When the guide 40 is not used, the second bearing 120 is positioned in the portion of the rail 200 supported by the base 2. The headstock 10 is supported with accuracy by the first bearing 110 on the rear side S2 and the second bearing 120 on the front side S2. When the guide 40 is used, the second bearing 120 is positioned in the portion of the rail 200 not supported by the base. The headstock 10 is in fact supported with accuracy by the first bearing 110 on the rear side S2 and the guide 40 on the front side S1. The embodiment, therefore, provides a machine tool capable of eliminating the need of specially modifying the rail.

Figure 8:
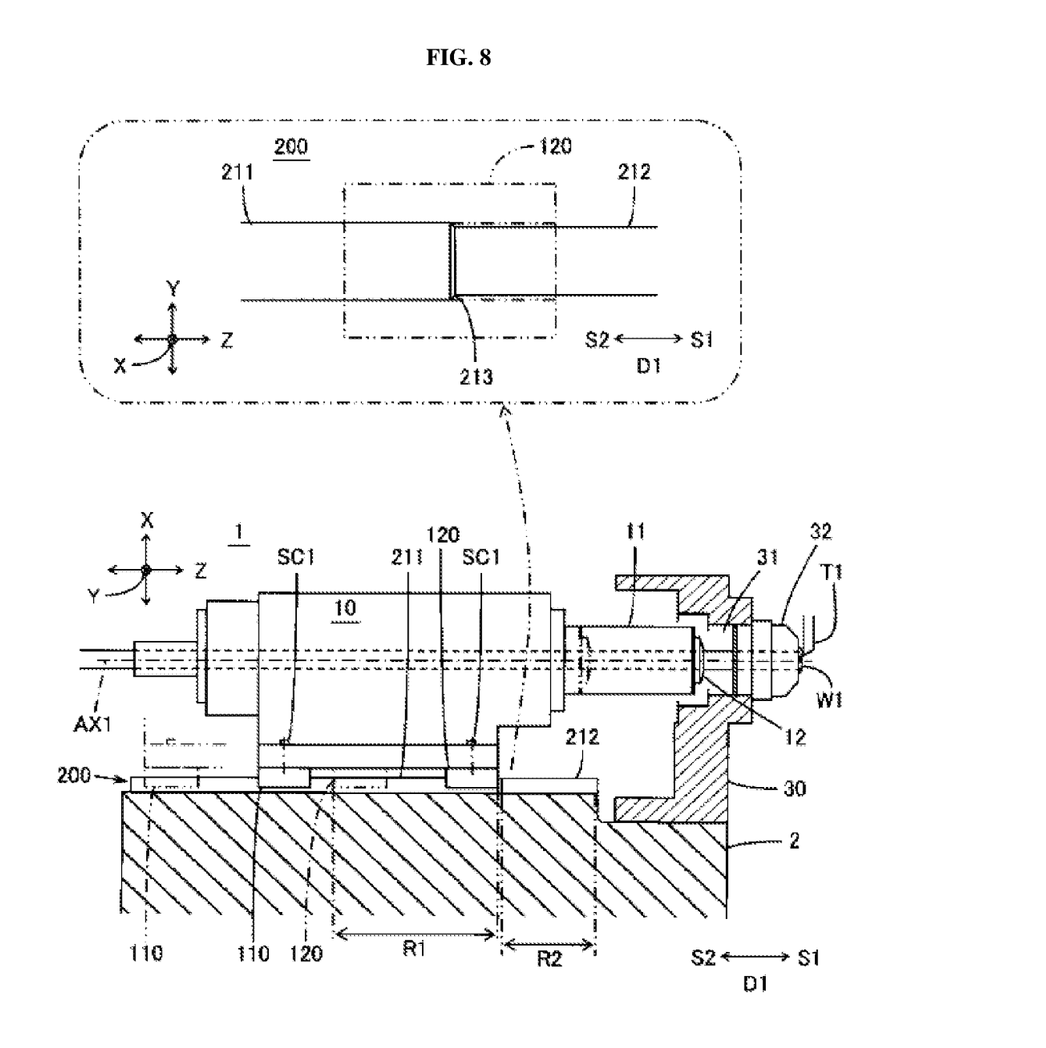
FIG. 8 is a partially sectional schematic view of the main part of the lathe in the guide bush mode.
Figure 9:
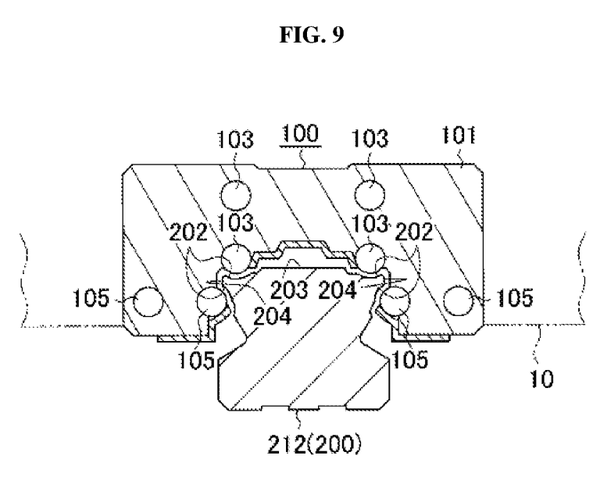
FIG. 9 is a vertically sectional view of the bearing and the rail.

In another embodiment as shown in FIG. 8 and FIG. 9, the portion 212 within the moving range R2 of the second bearing 120 when the headstock 10 is supported by the guide 40 may be thinner than the portion 211 within the moving range R1 of the second bearing 120 when the headstock 10 is not supported by the guide 40. When the guide 40 is not used, the second bearing 120 is positioned in the thicker portion of the rail 200. The headstock 10 is supported with accuracy by the first bearing 110 on the rear side S2 and the second bearing 120 on the front side S1. When the guide 40 is used, the second bearing 120 is positioned in the thinner portion of the rail 200, and therefore provided with a larger play. The headstock 10 is in fact supported with accuracy by the first bearing 110 on the rear side S2 and the guide 40 on the front side S1. The embodiment provides a machine tool suitable in an environment in which the rail is difficult to overhang enough so that an unsupported portion of the rail is not provided enough.

(2) FIRST EMBODIMENT OF THE MACHINE TOOL

Figure 1:
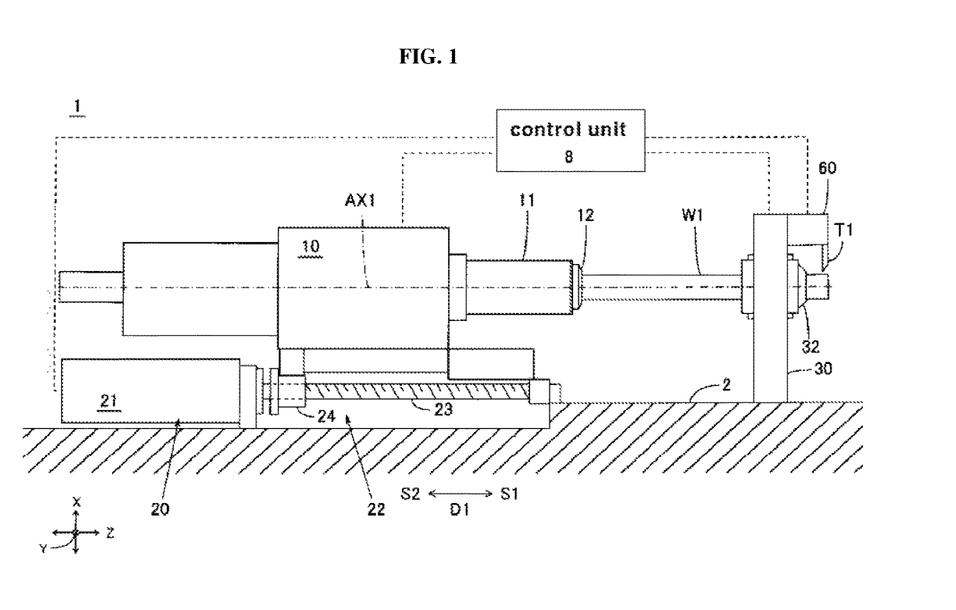
FIG. 1 is a partially sectional schematic view of a main part of a lathe.
Figure 2:
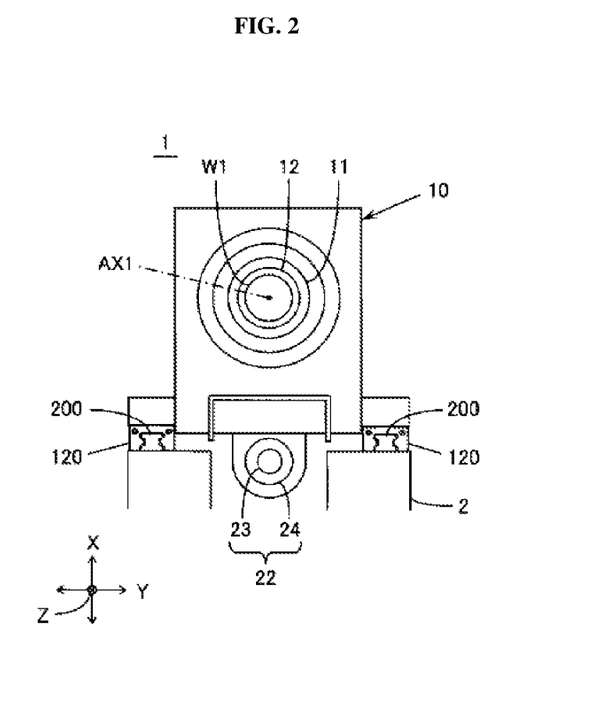
FIG. 2 is a schematic view of the lathe viewed from the main spindle axial direction.
Figure 3A:
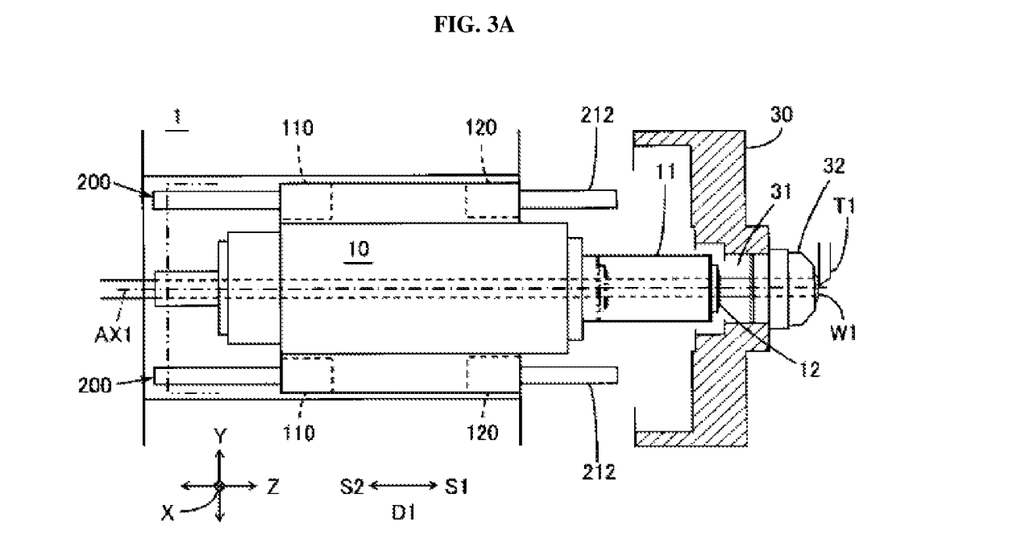
FIG. 3A is a partially sectional schematic view of the main part of the lathe in a guide bush mode.
Figure 3B:
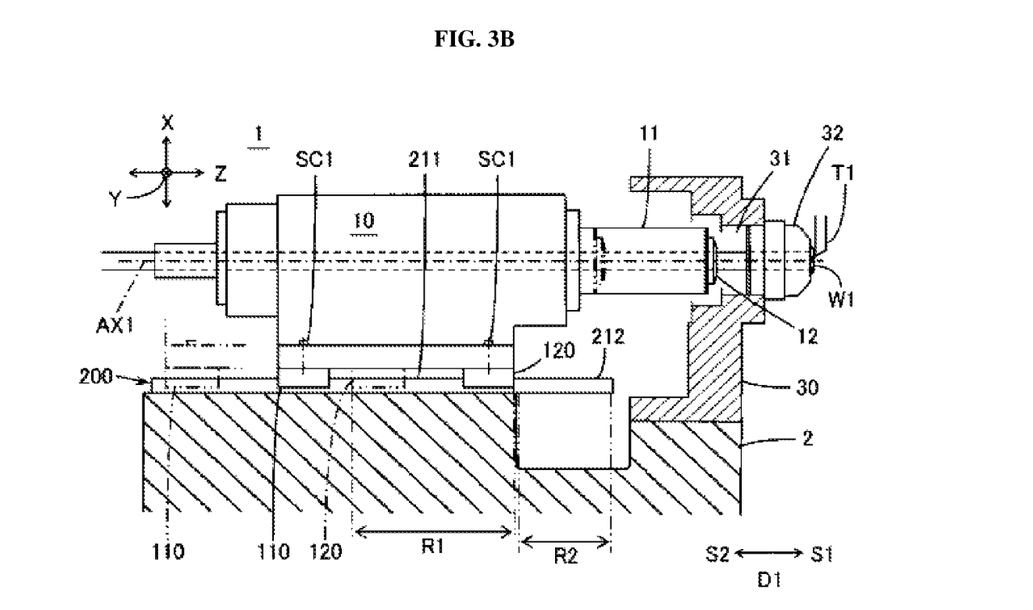
FIG. 3B is a partially sectional schematic view of the main part of the lathe in a guide bush mode.
Figure 4A:
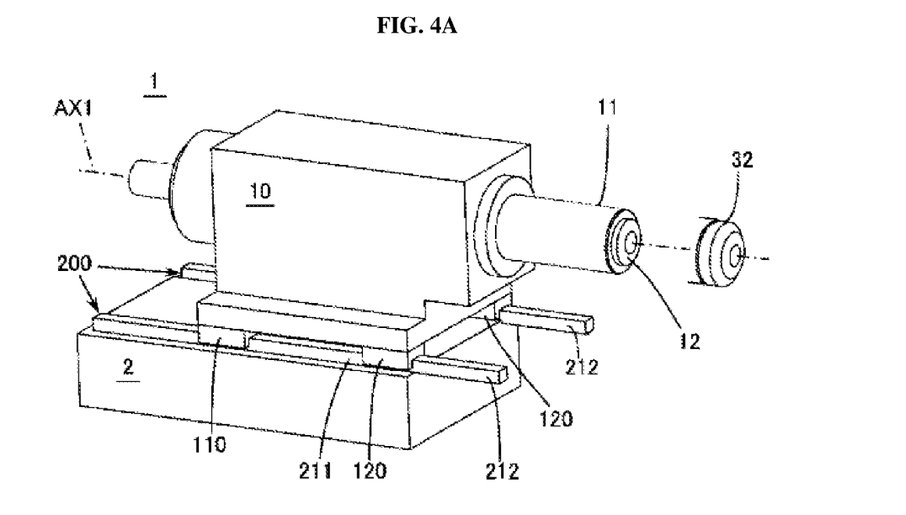
FIG. 4A is a perspective schematic view of the main part of the lathe.
Figure 4B:
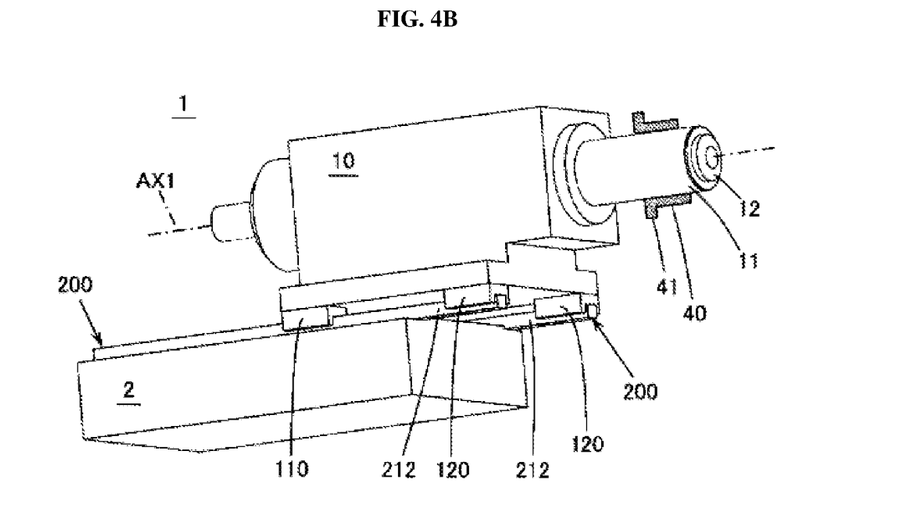
FIG. 4B is a perspective schematic view of the main part of the lathe.
Figure 5A:
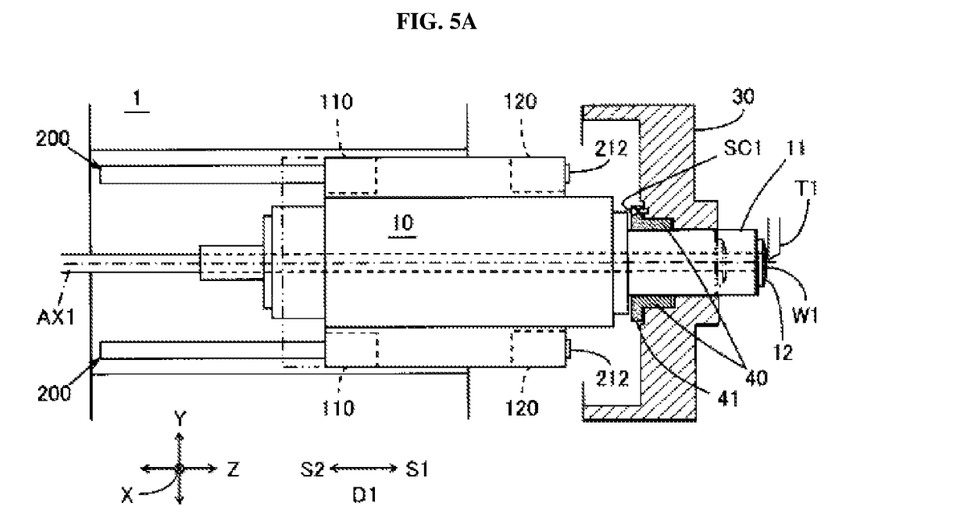
FIG. 5A is a partially sectional schematic view of the main part of the lathe in a non-guide bush mode.
Figure 5B:
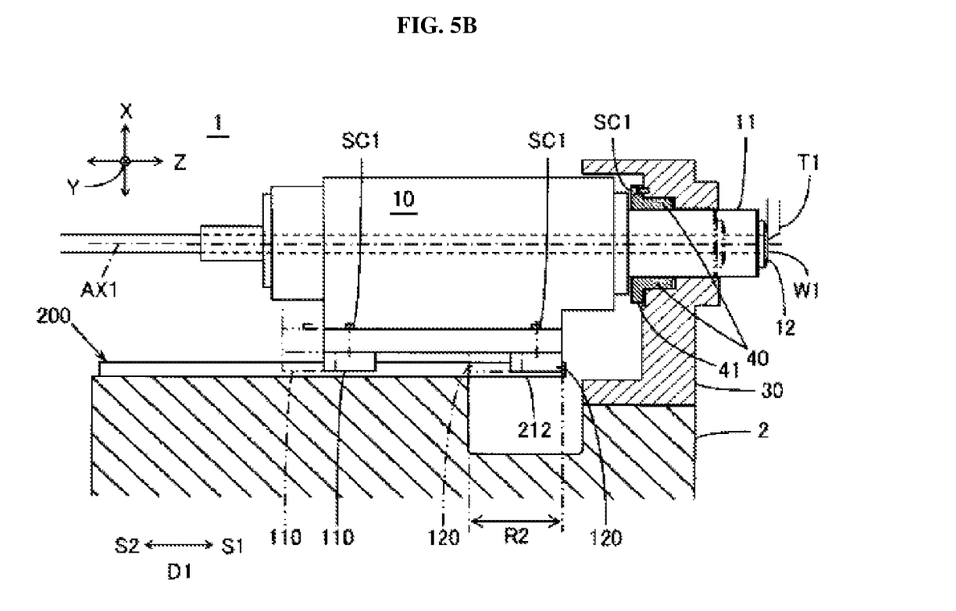
FIG. 5B is a partially sectional schematic view of the main part of the lathe in a non-guide bush mode.

FIG. 1 is a partially sectional schematic view of a main part of the sliding headstock type lathe (the machine tool) 1 in the guide bush mode. FIG. 2 is a schematic view of the lathe 1 in the guide bush mode viewed from the front side S1 with the supporting bed 30 omitted. FIG. 3A is a partially sectional schematic view of the main part of the lathe 1 in the guide bush mode viewed from above. FIG. 3B is a partially sectional schematic view of the main part of the lathe 1 in the guide bush mode viewed from a Y-direction. FIG. 4A is a schematic view of the main part of the lathe 1 in the guide bush mode. FIG. 4B is a schematic view of the main part of the lathe 1 in the non-guide bush mode. FIG. 5A is a partially sectional schematic view of the main part of the lathe 1 in the non-guide bush mode viewed from above. FIG. 5B is a partially sectional schematic view of the main part of the lathe 1 in the non-guide bush mode viewed from the Y-direction. In FIGS. 3A, 3B, 5A, and 5B, the headstock 10 in the most advanced position is shown by a solid line while the headstock 10 in the most retracted position by a two-dot chain line. The main spindle axial direction D1 may be referred to as a Z-direction. A direction perpendicular to the Z-direction may be referred to as an X-direction. The Y direction may be a horizontal direction perpendicular to the Z-direction. The X-direction, the Y-direction, and the Z-direction may be different directions favorably substantially perpendicular to each other for easier movement control. The directions may be shifted at an angle of less than 45 degrees to the perpendicular direction.

The lathe 1 shown in FIG. 1 to FIG. 5 includes, for example, the base 2, a control unit 8, the headstock 10, a driving unit 20, the supporting bed 30, a tool post 60, the rail 200, the first bearing 110, and the second bearing 120. The base 2 is also referred to as a bed or a table, constituting a supporting base, for example, for the driving unit 20, the supporting bed 30, and the rail 200. The control unit 8 controls operation of, for example, the headstock 10, the driving unit 20, and the tool post 60. The main spindle 12 mounted on the headstock 10 releasably grips the cylindrical (bar-shaped) workpiece W1 inserted in the Z-direction. The workpiece W1 is rotated around the main spindle axis AX1 extended along the longitudinal direction of the workpiece W1. The headstock 10 having the main spindle 12 mounted thereon to be rotatable around the main spindle axis AX1 is movable in the Z-direction. The cylindrical quill 11 is provided on the front end of the headstock 10 to support the main spindle 12 in a rotatable manner around the main spindle axis AX1. The quill 11 has a sectional shape of a circle as shown in FIGS. 4A and 4B.

The driving unit 20 includes an NC-controlled servo motor 21 and a feed mechanism 22 extended along the main spindle axis AX1, thereby moving the headstock 10 in the Z-direction. The feed mechanism 22 includes a ball screw 23 extended along the main spindle axis AX1 and a nut 24 engaged with the ball screw 23. The ball screw 23 is rotatably driven by the servo motor 21 around a rotational axis extended along the main spindle axis AX1. The nut 24 is fixed to the headstock 10 and moved in the main spindle axial direction D1 according to the rotation of the ball screw 23.

The guide bush 32 mounted on the supporting bed 30 is arranged on the front side of the main spindle 12 to support the workpiece W1 through the main spindle 12 in a slidable manner in the Z-direction. The guide bush 32 is rotationally driven around the main spindle axis AX1 in synchronization with the main spindle 12. The guide bush 32 is mounted on the supporting bed 30 in a detachable manner. The guide bush 32 prevents the workpiece from being bent, thereby improving machining accuracy. As shown in FIGS. 3A and 3B, when the guide bush 32 is mounted on the supporting bed 30, the headstock 10 is driven to allow the main spindle 12 to move in the Z-direction within a region on the rear side S2 of the guide bush 32. Undesirably, a longer portion of the workpiece W1 between the main spindle 12 and the guide bush 32 is left uncut. Further undesirably, a cut workpiece W1 whose outer circumferential surface of the workpiece W1 is held by the guide bush 32 is not permitted to be retracted into the guide bush 32 and then advanced again for another machining. The guide bush 32 is therefore removably mounted on the supporting bed 30 as shown in FIGS. 5A and 5B. When the guide bush 32 is removed, in order to shorten the distance from the main spindle 12 to the tool post 60, the headstock 10 is driven to move the main spindle 12 in the Z-direction within a region on the further front side S1 than when the guide bush 32 is mounted.

The quill guide 40 is removably mounted on the supporting bed 30, from which the guide bush 32 is removed, to support the quill 11 (the headstock 10) in a movable manner in the Z-direction. A sliding bearing is suitable for the quill guide 40, which is likely subject to machining load, but a rolling bearing and other bearings may be also applied. The quill 11 is slidably supported by the quill guide 40 (the sliding bearing) in the Z-direction. The quill guide 40 has a cylindrical shape having a flange 41 extended outward in the diameter direction (a direction away from the main spindle axis direction D1) as shown in FIGS. 5A and 5B. The quill 11 is inserted into the quill guide 40. The quill guide 40 is inserted into a though-hole 31 formed in the supporting bed 30 and fastened thereto with a screw SC1 put through the flange 41.

The tool post 60 is mounted on the supporting bed 30. A plurality of tools T1 is attached to the tool post 60 in a movable manner in the X-direction and the Y-direction. The tool T1 includes a stationary tool such as a turning tool and a rotary tool such as a drill. Further, a back working attachment provided with a back working spindle (sub spindle) may be provided on the base 2 to releasably grip the front-operated workpiece W1 inserted in the Z-direction.

The rail 200 is a linear motion guide. The rail 200 extended along the main spindle axis AX1 is arranged in two points in the Y-direction perpendicular to the main spindle axis AX1. The rail 200 overhangs the base 2 as shown in FIG. 3B. The overhanging portion of the rail 200 (the portion not supported by the base 2) is within the moving range R2 of the second bearing 120 in the non-guide bush mode as shown in FIG. 5B and not within the moving range R1 of the second bearing 120 in the guide bush mode. The overhanging portion of the rail 200 is lower in rigidity than the non-overhanging portion (the portion of the rail 200 supported by the base 2).

The first bearing 110 and the second bearing 120 are fixed to the headstock 10 and guided on the rail 200. The second bearing 120 is positioned on the front side S1 with respect to the first bearing 110 while on the rear side S2 with respect to the supporting bed 30. As shown in FIG. 3A and others, a combination of the first bearing 110 and the second bearing 120 is arranged on each of the rails 200. A ball bearing (a rolling bearing) is suitable for the first bearing 110 and the second bearing 120, but a roller bearing (another rolling bearing) and other bearings may be also applied. As shown in FIG. 3B, when the guide 40 is not used, the moving range R1 of the second bearing 120 corresponds to the non-overhanging portion 211 (the portion of the rail 200 supported by the base 2) and the moving range of the first bearing 110 is on the rear side S2 with respect to the moving range R1 of the second bearing 120 where the rail 200 is supported by the base 2. As shown in FIG. 5B, when the guide 40 is used, the moving range R2 of the second bearing 120 corresponds to the overhanging portion 212 (the portion of the rail 200 not supported by the base 2). The rail 200 overhanging the base 2 eliminates the need of moving the second bearing 120 in switching between the guide bush mode and the non-guide bush mode. When the guide 40 is used, the moving range of the first bearing 110 is on the rear side S2 with respect to the moving range R2 of the second bearing 120 where the rail 200 is supported by the base 2. Each of the components 2, 10, 20, 30, 40, 60, 110, 110, 120, and 200 may be mainly made of metal.

Figure 6:
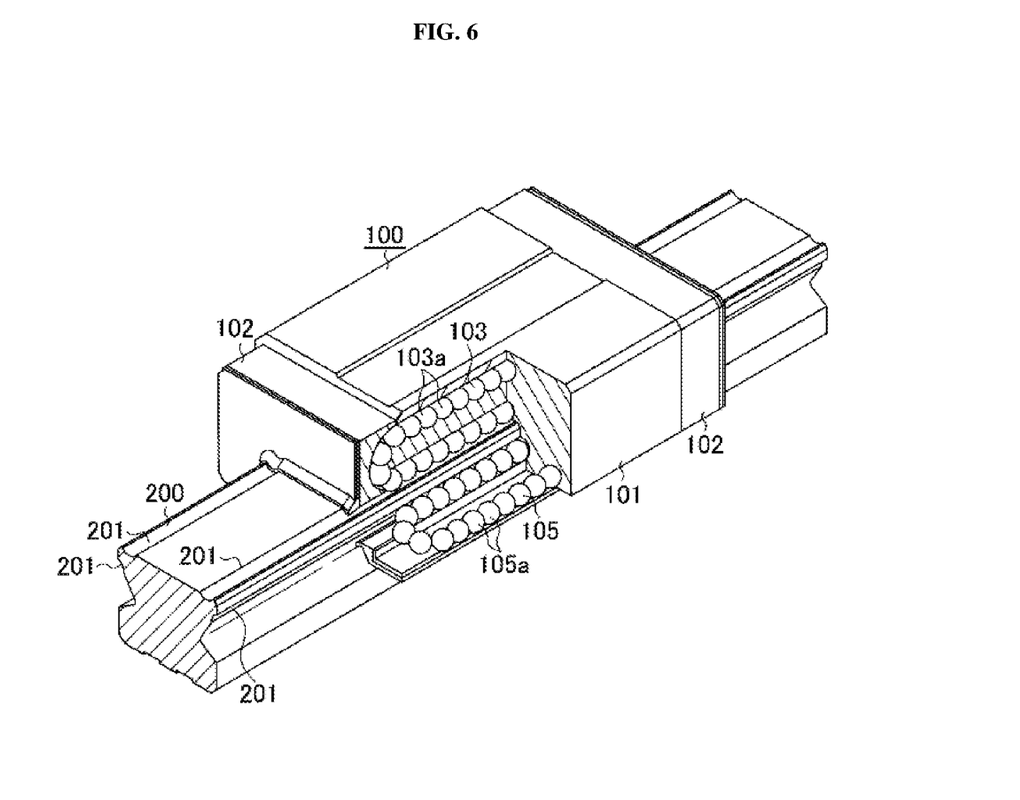
FIG. 6 is a partially sectional perspective view of a bearing and a rail.
Figure 7:
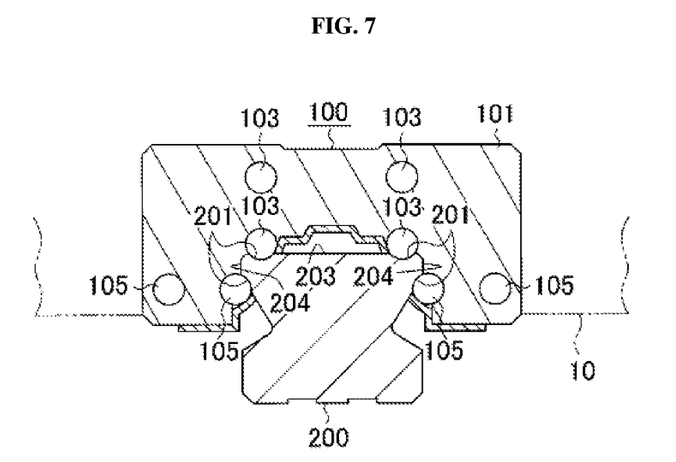
FIG. 7 is a vertically sectional view of the bearing and the rail.

FIG. 6 is a partially sectional view of a bearing 100 and the rail 200 where the bearing 100 is a generic term of the first bearing 110 and the second bearing 120. FIG. 7 is a vertically sectional view of the bearing 100 and the rail 200. The bearing 100 comprises a ball bearing for linear motion including a bearing block 101, a pair of end plates 102, a pair of first ball strings 103, and a pair of second ball strings 105. The bearing block 101 is fixed on the lower surface of the headstock 10. The end plates 102 are respectively attached to the front and rear ends of the bearing block 101. A ball 103a of the ball string 103 and a ball 105a of the ball string 105 are respectively movable in a circular path formed by the bearing block 101 and the pair of end plates 102. The rail 200 is provided with a guide groove 201 where part of the ball strings 103 and 105 enters. Specifically, part of the ball string 103 enters the guide groove 201 on an upper surface 203 of the rail 200 while part of the ball string 105 enters the guide groove 201 on a side surface 204 of the rail 200. The balls 103a and 105a are surely movable within the circular path to enable the bearing 100 to move in the Z-direction along the rail 200. The balls 103a and 105a would be likely out of the circular path without the rail 200.

The bearing 100 is joined to the headstock 10 with the screw SC1. Specifically, the first bearings 110 and the second bearings 120 are respectively joined at four points in total. The headstock 10 is therefore supported on the base 2 in a movable manner in the Z-direction. Various types of the ball bearing may be applied. For example, use of a type of the ball bearing to allow the first ball string 103 to enter a guide groove formed in the area between the upper surface 203 and the side surface 204 of the rail 200 would improve strength against load applied from the direction of the side surface 204. The number of the ball strings is not limited to four but may be eight or any number including five or more or three or less.

A method of switching between the guide bush mode and the non-guide bush mode is being described. The guide bush mode as shown in FIG. 3B is switched to the non-guide bush mode as shown in FIG. 5B in the following manner. First, the guide bush 32 is removed from the supporting bed 30, the headstock 10 is moved to the rear side, and the quill guide 40 is set around the quill 11. The headstock 10 is then moved to the front side within the moving range R1 of the second bearing 120 in the guide bush mode, and then the quill guide 40 is joined to the supporting bed 30 by the screw SC1. There exists the rail 200 within the moving range R2 of the second bearing 120 in the non-guide bush mode. The headstock 10 may be only moved to the front side by the driving unit 20 until the second bearing 120 comes within the moving range R2 as shown in FIG. 5B to machine the workpiece W1 in the non-guide bush mode. This eliminates the need of sliding the second bearing 120 to the rear side and the need of jacking up the headstock 10, thereby reducing labor and time and also preventing damage to the quill 11 or others caused by an error in a jacking-up operation.

The non-guide bush mode as shown in FIG. 5B is switched to the guide bush mode as shown in FIG. 3B in the following manner. The headstock 10 is moved to the rear side, and the guide bush is attached to the supporting bed 30. The rail 200 is continuously connected from the moving range R2 to the moving range R1 of the second bearing 120. The headstock 10 may be only moved by the driving unit 20 until the second bearing 120 comes within the moving range R1 to machine the workpiece in the guide bush mode. This eliminates the need of sliding the second bearing 120 to the front side and the need of jacking up the headstock 10, thereby reducing labor and time and also preventing damage to the quill 11 or others caused by an error in a jacking-up operation.

In the guide bush mode, the guide bush 32 is likely subject to load caused by turning or other machining operations. As shown in FIG. 3B, the portion 211 of the rail 200 within the moving range R1 of the second bearing 120 is on the base 2 to be supported thereby. The second bearing 120 is therefore provided with a smaller play when the guide 40 is not used rather than when the guide 40 is used. The portion of the rail within the moving range of the first bearing 110 is also on the base 2 to be supported thereby. The headstock 10 is supported with accuracy by the first bearing 110 on the rear side S2 and the second bearing 120 on the front side S1 when the quill guide 40 is not used.

In the non-guide bush mode, the quill guide 40 is likely subject to load caused by turning or other machining operations. As shown in FIG. 5B, the headstock 10 is also supported by the quill guide 40 mounted on the supporting bed 30. The portion 212 of the rail 200 within the moving range R2 of the second bearing 120 is not supported by the base 2. The portion 212 is lower in rigidity than the portion supported by the base 2. The portion 212 is easier to be deformed due to load applied from the second bearing 120. The second bearing 120 is provided with a larger play. Supporting capability of the second bearing 120 for the headstock 10 is therefore restricted. The portion of the rail within the moving range of the first bearing 110 is on the base 2 to be supported thereby. Three-point support (multi-support) in the Z-direction is canceled without moving the second bearing 120. The headstock 10 is in fact supported with accuracy at two points by the first bearing 110 on the rear side S2 and the guide 40 on the front side S1 when the guide 40 is used. This assures smooth movement of the headstock 10 and prevents damage thereof.

As described above, the first embodiment eliminates the need of sliding the second bearing 120 to the front side and the need of jacking up the headstock 10, thereby reducing labor and time in switching between the guide bush mode and the non-guide bush mode. The first embodiment also eliminates the need of specially modifying the rail.

(3) SECOND EMBODIMENT

FIG. 8 is a partially sectional Y-direction schematic view of the main part of the lathe 1 in the guide bush mode of a second embodiment with an enlarged view of the upper surface of the rail 200. FIG. 9 is a vertically sectional view of the bearing 100 and the rail 200 of the second embodiment. The rail 200 is entirely supported on the base 2 in the longitudinal direction (Z-direction). The portion 212 within the moving range R2 of the second bearing 120 in the non-guide bush mode is thinner than the portion 211 within the moving range R1 in the guide bush mode. The other detailed description common to the first embodiment is being omitted.

The rail 200 has a slope 213. The portion 212 on the front side S1 of the slope 213 is of a narrower width (a length in the Y-direction) than the portion 211 on the rear side S2 thereof. The rear side portion 211 inclusive of the bearing 100 has a sectional shape as shown in FIG. 7. The front side portion 212 inclusive of the bearing 100 has a sectional shape as shown in FIG. 9. The guide groove 202 of the front side portion 212 is deeper than the guide groove 201 of the rear side portion 211 to a degree that the balls 103a and 105a are kept therethough. The front side portion 212 is thereby thinner than the rear side portion 211, providing a larger play on the second bearing 120 in the directions but the Z-direction. The front side portion 212 prevents the balls 103a and 105a from coming off the second bearing 120. The slope 213 has a narrower incline toward the front side S1 to match the outer surfaces of the portions 211 and 212 so that the second bearing 120 is smoothly moved from the moving range R2 to the moving range R1.

The portions 211 and 212 and the slope 213 are integrally formed in FIG. 8. Alternatively, the portions 211 and 212 may be separately formed. For example, the rail 200 may comprise an outer rail constituting the thicker rear side portion 211 with the slope 213 and an inner rail constituting the thinner front side portion 212. Specifically, the outer rail and the inner rail may be straightly aligned to constitute the rail 200 with the end of the inner rail facing against the front side of the slope 213 of the outer rail.

In the guide bush mode, the portion 211 of the rail 200 within the moving range R1 is thicker, and the second bearing 120 is provided with a smaller play with respect to the rail 200. The headstock 10 is supported with accuracy by the first bearing 110 on the rear side S2 and the second bearing 120 on the front side S1. In the non-guide bush mode, the portion 212 of the rail 200 within the moving range R2 is thinner and the second bearing 120 is provided with a larger play with respect to the rail 200. Supporting capability of the second bearing 120 with respect to the headstock 10 is therefore restricted. Three-point support (multi-support) in the Z-direction is canceled without moving the second bearing 120. The headstock 10 is in fact supported with accuracy at two points by the first bearing 110 on the rear side S2 and the guide 40 on the front side S1 when the guide 40 is used. This assures smooth movement of the headstock 10 and prevents damage thereof.

The invention provides a machine tool capable of facilitating a switching between the guide bush mode and the non-guide bush mode. The second embodiment provides a machine tool suitable in an environment in which the rail is difficult to overhang enough so that an unsupported portion of the rail is not provided enough.

(4) MODIFIED EMBODIMENT

The invention may be variously embodied. For example, in an environment in which the rail is allowed to overhang enough, the thinner front side portion 212 of the second embodiment may be modified to overhang without support of the base 2. As far as all of the balls 103a and 105a are held only by the second bearing 120 by use of a ball holder band, the invention can be applied to the rail 200 even without the front side portion 212. Use of the ball holder band prevents the balls 103a and 105a from coming off the second bearing 120 when moved from the moving range R1 to the moving range R2, assuring smooth movement of the second bearing 120. The invention is not limited to a lathe but applicable to another type of machine tool.

(5) CONCLUSION

The invention provides a machine tool capable of facilitating a switching operation between the guide bush mode and the non-guide bush mode. The basic functions and effects are available even if the technology includes only the elements in the independent claim (including the embodiment) and not the elements in the dependent claims. The invention includes any replacement or exchange of the configurations disclosed in the embodiments and the modifications. The invention also includes any replacement or exchange of the prior arts and the configurations disclosed in the embodiments and the modifications.

What is claimed is:

1. A machine tool comprising:
   a headstock provided with a main spindle for gripping a workpiece;
   a rail extended along a main spindle axis;
   a first bearing fixed to the headstock and guided on the rail;
   a second bearing fixed to the headstock and guided on the rail, the second bearing being provided in a location spaced apart from a front end of the first bearing;
   a supporting bed;
   a guide bush; and
   a guide,
   wherein the guide bush and the guide are removably mounted on the supporting bed in an alternative way,
   wherein, in a guide-bush mode in which the guide bush is mounted on the supporting bed, the guide bush slidably supports the workpiece on a front side of the main spindle, and, in a non-guide-bush mode in which the guide is mounted on the supporting bed instead of the guide bush, the guide movably supports the headstock in a direction of the main spindle axis; and
   wherein, the rail includes a portion that provides a larger amount of play on the second bearing in the non-guide-bush mode compared with the amount of play in the guide-bush mode only by moving the headstock toward the supporting bed, and into the rail portion that provides the larger amount of play on the second bearing, when the guide-bush mode is switched to the non guide-bush mode.

2. The machine tool of claim 1, further comprising a base which supports the rail, wherein the rail portion that provides the larger amount of play is not supported by the base such that there is greater play on the second bearing when the headstock is movably supported by the guide.

3. The machine tool of claim 1, wherein the rail portion that provides the larger amount of play is thinner than another portion of the rail within a moving range of the second bearing in the guide-bush mode.

4. The machine tool of claim 2, wherein the rail portion that provides the larger amount of play is thinner than another portion of the rail within a moving range of the second bearing in the guide-bush mode.

* * * * *